(12) United States Patent  
Shirase et al.

(10) Patent No.: US 6,685,152 B2  
(45) Date of Patent: Feb. 3, 2004

(54) CONTAINER HOLDER

(75) Inventors: Yuichi Shirase, Aichi-ken (JP); Kunio Kiyohara, Toyota (JP); Takanobu Nakaguro, Toyota (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/225,122

(22) Filed: Aug. 22, 2002

(65) Prior Publication Data

US 2003/0042382 A1 Mar. 6, 2003

(30) Foreign Application Priority Data

Aug. 29, 2001 (JP) ........................................ 2001-259445

(51) Int. Cl.⁷ ................................................ A47K 1/08
(52) U.S. Cl. .................. 248/311.2; 312/312.1; 224/926; 297/188.01
(58) Field of Search ............................. 248/311.2, 312, 248/312.1, 309.1; 224/926; 297/188.01

(56) References Cited

U.S. PATENT DOCUMENTS

| | | | |
|---|---|---|---|
| 4,792,174 A | | 12/1988 | Shioda |
| 5,232,262 A | * | 8/1993 | Tseng ................... 297/188.17 |
| 5,379,978 A | * | 1/1995 | Patel et al. ............... 248/311.2 |
| 5,673,891 A | | 10/1997 | Fujihara et al. |
| 5,692,718 A | * | 12/1997 | Bieck ...................... 248/311.2 |
| 5,845,888 A | * | 12/1998 | Anderson ................ 248/311.2 |
| 5,944,240 A | | 8/1999 | Honma |
| 6,019,334 A | * | 2/2000 | Shinomiya ............... 248/311.2 |
| 6,036,152 A | * | 3/2000 | Hiscox et al. ........... 248/311.2 |
| 6,065,729 A | * | 5/2000 | Anderson ................ 248/311.2 |
| 6,105,917 A | * | 8/2000 | Yabuya et al. ........... 248/311.2 |
| 6,464,187 B1 | * | 10/2002 | Bieck et al. ............. 248/311.2 |

FOREIGN PATENT DOCUMENTS

| EP | 1 099 596 | 5/2001 |
|---|---|---|
| GB | 2 241 872 | 9/1991 |

* cited by examiner

Primary Examiner—Ramon O. Ramirez  
Assistant Examiner—Amy J. Sterling  
(74) Attorney, Agent, or Firm—Kanesaka & Takeuchi

(57) ABSTRACT

A container holder includes a case and a tray. The tray is provided with an opening portion for allowing a container to be inserted therein, and a holder member for holding the container. The holder member is supported in the opening portion. The holder member is raised and fallen down by a stand-up-fall-down device, while a portion of the holding member facing an opening of the case slides relative to the opening.

7 Claims, 11 Drawing Sheets

CONTAINER HOLDER

BACKGROUND OF THE INVENTION AND RELATED ART STATEMENT

This invention relates to a container holder provided in an automobile or the like for holding a container.

A container holder for holding a beverage container or the like is provided in a dashboard in front of a front seat in an automobile. As shown in FIGS. 10 and 11, a container holder 100 includes a case 102 disposed on a back surface side of a dashboard 104 so that the case 102 is not seen from a compartment of the automobile.

A frame-like tray 106 is housed in the case 102 so that the tray 106 can be drawn out of the case 102 as needed. A pin 108 is provided at a forward end portion of the tray 106, and a holder 110 is rotatably supported so that the holder 110 covers an outer wall of the tray 106.

The holder 110 includes an opening portion 110A where a container, not shown, can be received. Also, on a free end side of the holder 110, a holding arm 112 having a substantially U-shape is rotatably supported inside the tray 106. A portion 112B extending between leg portions 112A of the holding arm 112 supports a container inserted into the holder 110.

With the above described structure, when the tray 106 is housed in the case 102, the holder 110 is rotated around the forward end portion of the tray 106, and the holding arm 112 is rotated around the free end side of the holder 110, so that they are housed in a folded state, respectively.

Incidentally, a shift knob and so on are disposed around a dashboard 104. If the tray 106 projects from the dashboard 104 in a large extent, the projected portion may cause a hindrance. Therefore, the case 102 is positioned to be inclined diagonally upward with respect to a horizontal direction of a body of the automobile, so that the tray 106 projects diagonally upward. Thus, a distance between the forward end surface of the tray 106 and the surface of the dashboard 104 can be made small, so that the tray 106 does not project forward too much.

However, since the holder 110 is rotated around the pin 108 disposed on the forward end of the tray 106, it is required to have a clearance t1 for a moving path of the holder 110. Also, since the holder 110 and the holding arm 112 rotate with the tray 106 therebetween, the holder 110 and the holding arm 112 may interfere with each other. Therefore, the tray 106, the holder 110 and the holding arm 112 have to be manufactured with high precision not to interfere with each other, resulting in a higher cost.

In view of the above problems, the present invention provides a container holder, wherein the clearance between the dashboard and the holder can be made as small as possible at a lower cost.

Further objects and advantages of the invention will be apparent from the following description of the invention.

SUMMARY OF THE INVENTION

According to the first aspect of the invention, a tray is housed in a case to be drawn out. The tray is provided with an opening portion for allowing a container to be inserted therein, and a holder member for holding the container is provided in the opening portion. The holder member is raised and fallen down by a stand-up-fall-down device, while a portion of the holding member facing the opening of the case slides in a direction away from the opening relative to the tray.

In other words, when the container holder is used, the tray is drawn out of the case by sliding the same. Therefore, the holder member provided in the tray is ready to stand up, and the holder member stands up while the portion facing the opening of the case slides in the direction away from the opening by the stand-up-fall-down device. Thus, the container holder is in a state where a container can be placed.

On the other hand, when the tray is housed in the case, the holder member is fallen down while sliding the portion facing the opening of the case in a direction away from the opening, to thereby house the tray in the case.

As described above, when the tray is drawn out of the case or is housed in the case, the clearance between the opening of the case and the holder can be made smaller by allowing the holder member to stand up or fall down while sliding the portion facing the entrance of the case in the direction parting from the entrance, as opposed to a case where the holder member is simply rotated to stand up or fall down.

Therefore, the clearance between the surface of a dashboard for fixing the case thereto and the holder member can be made smaller. Thus, the tray does not project too much to become a hindrance.

According to the second aspect of the invention, the tray supports a link with one end rotatably connected to the holder member. A guiding device is provided to the case, and abuts against the other end of the link so that the sliding movement of the tray is converted to a rotating movement of the link to allow the holder member to stand up or fall down while sliding the holder member by the stand-up-fall-down device.

As described above, since the guiding device is provided, the holder member is allowed to stand up or fall down through the link only by sliding the tray. Thus, using the container holder is very handy.

According to the third aspect of the invention, the holder member includes a holding portion for holding the side surface of the container and a receiving portion extending from the holding portion for receiving a bottom surface of the container. As described above, since the receiving portion for holding the container is integrally provided to the holder member, the number of parts of the container holder can be reduced, which leads to a lower cost.

According to the fourth aspect of the invention, the receiving portion is positioned to be substantially horizontal in a state that the holder member stands up. Thus, the container can be held vertically with respect to the receiving portion.

According to the fifth aspect of the invention, the link is urged in a direction allowing the holder member to stand up. Thus, in a state that the tray is drawn out of the case, the holder member is held in the stand-up state through the link.

According to the sixth aspect of the invention, the stand-up-fall-down device is formed of a slot and a pin, wherein the pin provided to the holder member is engaged with the slot provided to the case. Thus, the holder member is allowed to stand up or fall down while sliding the portion facing the opening of the case in the direction away from the opening.

According to the seventh aspect of the invention, the guide device is a groove, and a pin provided on the other end of the link and moving along a circular arc hole formed on the tray can abut against an edge of the groove. With the guide device, the holder member is allowed to stand up or fall down while sliding the holder member by the stand-up-fall-down device.

DETAILED DESCRIPTION OF THE PREFERRED EMBODIMENT

Hereunder, embodiments of a container holder according to the invention will be explained with reference to the accompanied drawings.

Figure 1:
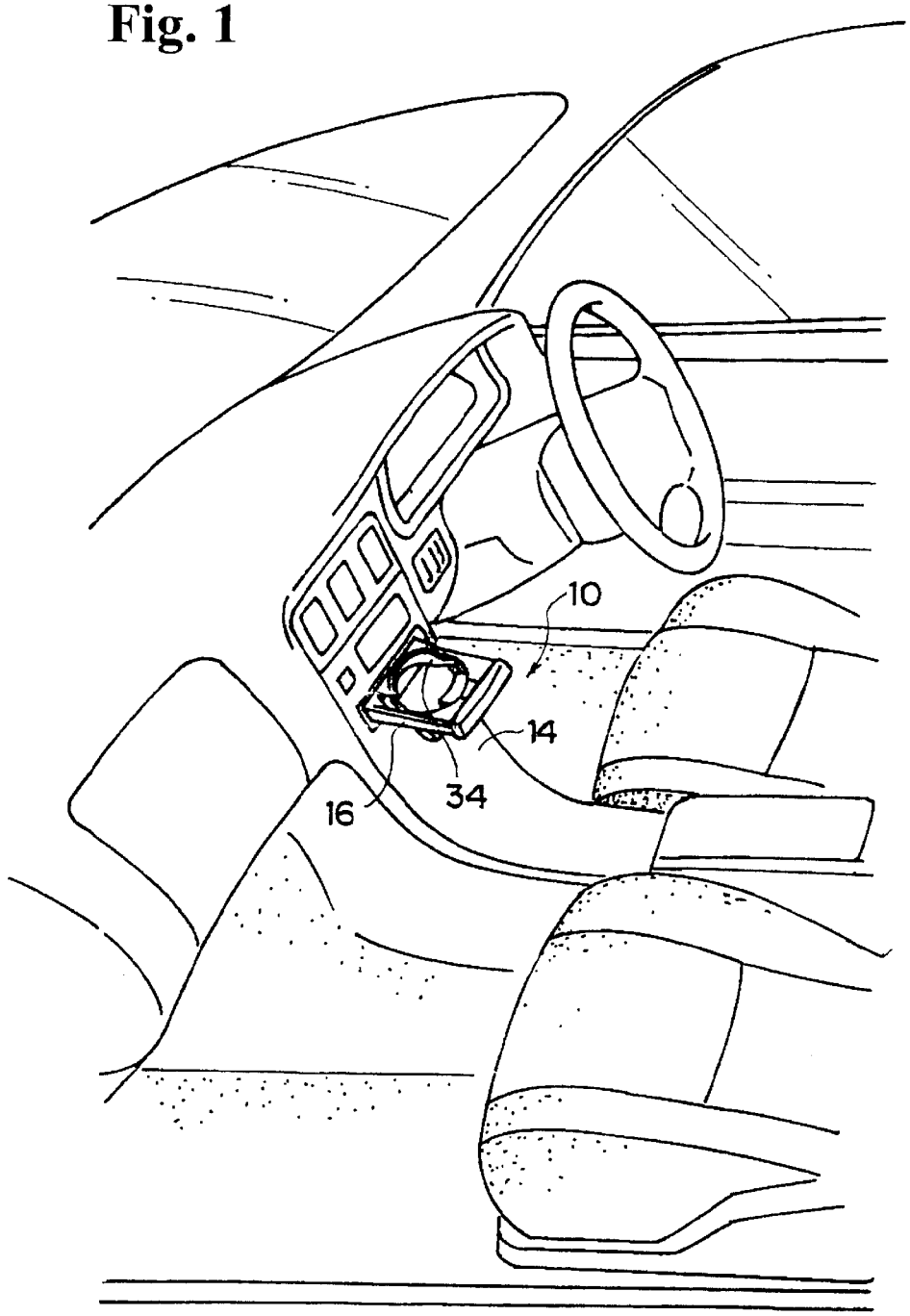
FIG. 1 is a perspective view showing a state that a container holder according to an embodiment of the invention is provided to a dashboard.
Figure 2:
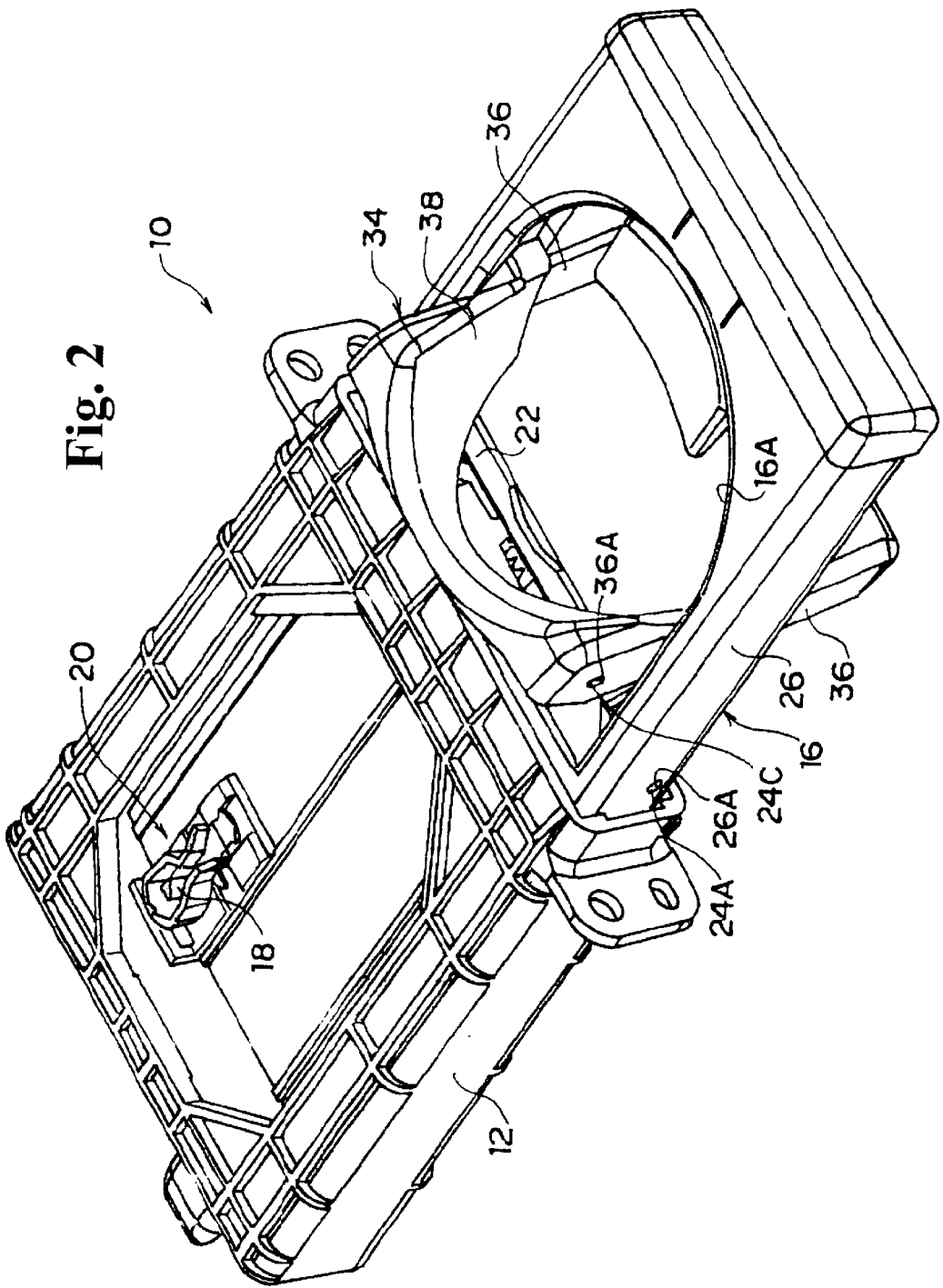
FIG. 2 is a perspective view showing the container holder according to the embodiment of the invention.

In FIGS. 1 and 2, a container holder 10 according to an embodiment of the invention is shown. The container holder 10 includes a case 12 disposed on a back surface side of a dashboard 14 and is not seen in a car.

A frame-like tray 16 is housed in the case 12 so that the tray can be drawn out as needed. Also, a latching device 20 having a heart-shape cam 18 is provided in an inner part of the case 12, and can be engaged with a tracing member, not shown, provided on the tray 16.

The tray 16 is urged in a projecting direction from the case 12 by a spring (not shown). When the tray 16 is pressed in the inner-part direction (a direction against the urging force of the spring) of the case 12, the tracing member is engaged with a depressed portion of the heart-shape cam 18 to thereby keep the tray 16 stored in the case 12.

When the tray 16 is pressed toward the inside of the case 12 from the above-described state, the tracing member crosses a mountain portion of the heart-shape cam 18 to release the engagement with the heart-shape cam 18, and at the same time, the tray projects from the case 12. Thus, the tray 16 can be drawn out of the case 12.

Figure 3:
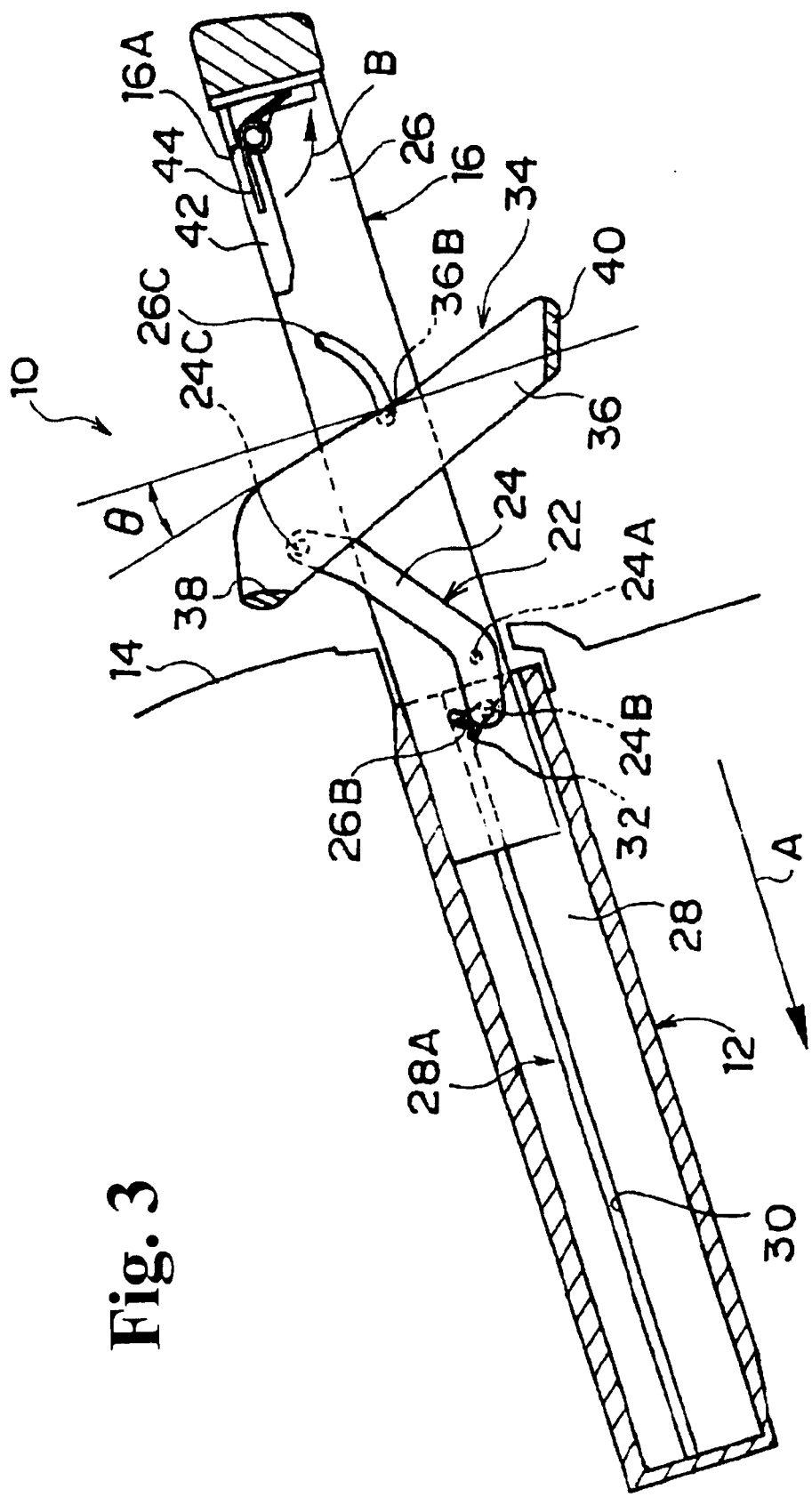
FIG. 3 is a schematic sectional view showing the container holder of the embodiment, wherein a holder stands up.

As shown in FIGS. 2 and 3, an opening portion 16A of the tray 16 has a substantially circular shape. A substantially U-shape link 22 is disposed in an inner side of the tray 16. A pin 24A is projected outward from one end of each of the leg portions 24 of the link 22, and the pin 24A is fitted into a through-hole 26A formed on each sidewall 26 of the tray 16. Thus, the link 22 can be rotated around the pins 24A.

Also, a pin 24B is fitted in the one end of each leg portion 24 of the link 22. A circular arc hole 26B is provided to each of the sidewalls 26 of the tray 16 so that the pin 24B can engage therewith. Thus, the pin 24B can be moved along the circular arc hole 26B corresponding to the rotation movement of the link 22.

A guide groove 28A (guiding device) is formed on a sidewall 28 of the case 12. The guide groove 28A includes a flat surface 30, and an inclined surface 32 extending downwardly along an entrance of the case 12, so that the pin 24B can be raised or lowered by moving along the guide groove 28A.

In other words, by moving in an arrow-A direction along the guide groove 28A, the pin 24B is raised by the inclined surface 32, and by moving in a direction opposite to the arrow A direction along the guide groove 28A, the pin 24B is lowered by the inclined surface 32.

A pin 24C projects outward from the other end of each leg portion 24 of the link 22, and is fitted into a hole portion 36A formed on one end of each leg portion 36 (position facing each side wall 26 of the tray 16) of a frame-shape holder 34 (holding member) positioned inside the tray 16, so that the holder 34 can be rotated around the pin 24C.

Pins 36B (stand-up-fall-down means) provided at respective centers of the leg portions 36 of the holder 34 are projected outward, respectively. Each pin 36B can be engaged with a circular arc shape slot 26C (stand-up-fall-down means) formed on each sidewall 26 of the tray 16.

Thus, when the link 22 is rotated, the holder 34 is rotated around the pins 24C, the pins 36B are moved along the slots 26C, and the holder 34 stands up or falls down (refer to FIG. 6) with respect to the tray 16.

Figure 8:
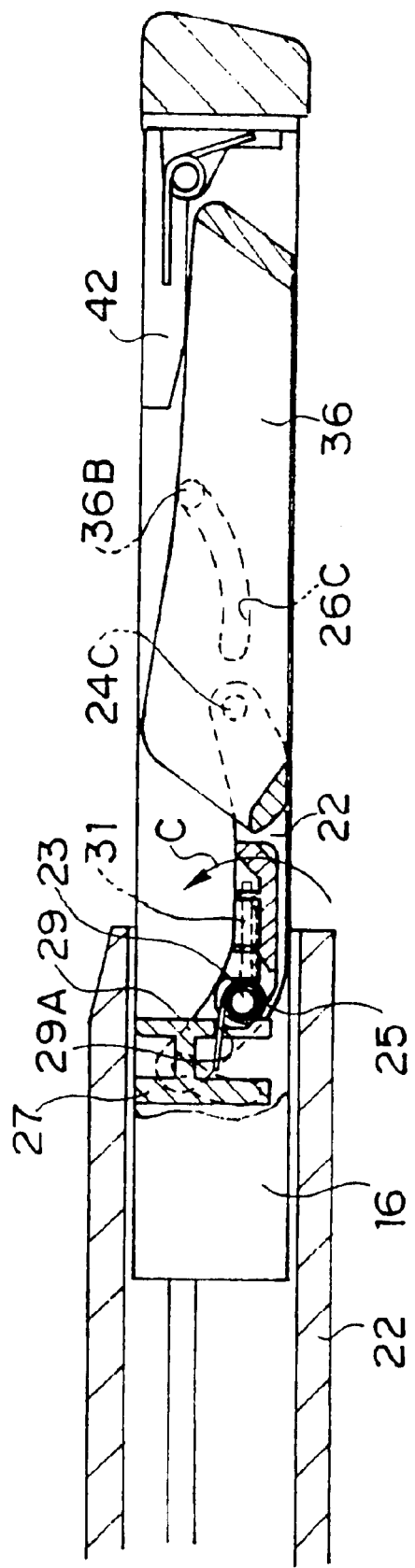
FIG. 8 is a partial sectional view showing the container holder of the embodiment, wherein a torsion spring for urging a link in its standing-up direction is shown.

As shown in FIG. 8, the link 22 is provided with an attaching portion 23 on an extended line connecting both pins 24A, and a torsion spring 25 is provided to the attaching portion 23.

In the inner part of the tray 16, a plurality of ribs 27 is suspended from a ceiling surface of the tray 16 to reinforce the tray 16. Among the ribs 27, rib 29 close to the attaching portion 23 is provided with a notched portion 29A where a length of the forward end portion is shortened. One end portion of the torsion spring 25 is supported by the notched portion 29A. Therefore, a rotating force in an arrow C direction is applied to the other end of the torsion spring 25.

The leg portion 24 of the link 22 is provided with a flange 31 extending outward, and the other end portion of the torsion spring 25 abuts against a lower surface of the flange 31. Thus, a rotating force in the arrow C direction is applied to the link 22 to thereby hold the like 22 in a stand-up state. Therefore, the holder 34 is held in the stand-up state through the link 22.

As shown in FIG. 3, the holder 34 in the stand-up state is slightly inclined with respect to the tray 16 (an inclined angle θ), and a front wall (receiving portion) 40 of the holder 34 becomes substantially horizontal. Thus, the front wall 40 receives a bottom of the container to thereby hold the container.

As described above, since the front wall 40 for holding the container is integrally provided to the holder 34, the number of parts of the container holder 10 can be reduced, which results in a lower cost.

In the stand-up state of the holder 34, a rear wall 38 of the holder 34 has a circular arc shape extending in a vertical direction with respect to the horizontal surface of the car body. In a state that the front wall 40 holds the container, the rear wall 38 supports the side surface of the container together with an inner edge portion of an opening portion 16A of the tray 16.

Also, a support member 42 is rotatably supported on the forward end side of the tray 16, and can extend from an inner edge portion of the opening portion 16A. One end of a torsion spring 44 abuts against the support member 42 and the other end thereof abuts against the tray 16, so that the support member 42 is urged in a direction extending from the inner edge portion of the opening portion 16A.

When the support member 42 is pressed in a direction against the urging force of the torsion spring 44, the supporting member 42 is rotated in an arrow B direction, so that an projection quantity thereof from the opening portion 16A is changed. In other words, since the supporting member 42 is rotated corresponding to an outer diameter of the container, the holder 34 and the supporting member 42 can securely hold the container.

Next, the action of the container holder according to the embodiment will be explained.

Figure 6:
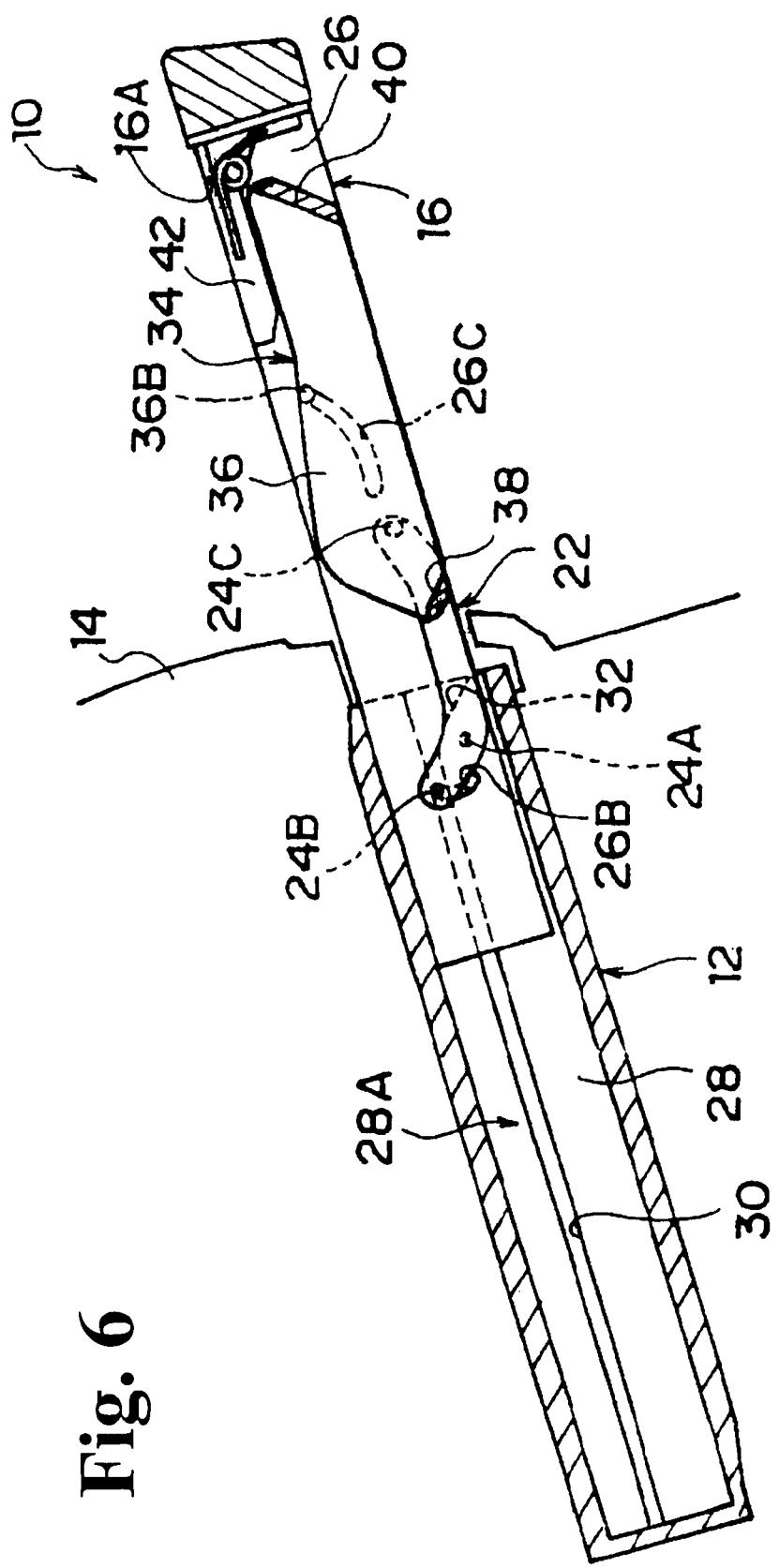
FIG. 6 is a schematic sectional view showing the container holder of the embodiment, wherein the holder falls down.

As shown in FIG. 6, when the tray 16 is drawn out of the case 12, with the sliding movement of the tray 16, the pin 24B provided to the link 22 is moved along the flat surface 30 of the guiding groove 28A formed on the case 12, and then lowered along the inclined surface 32.

Figure 5:
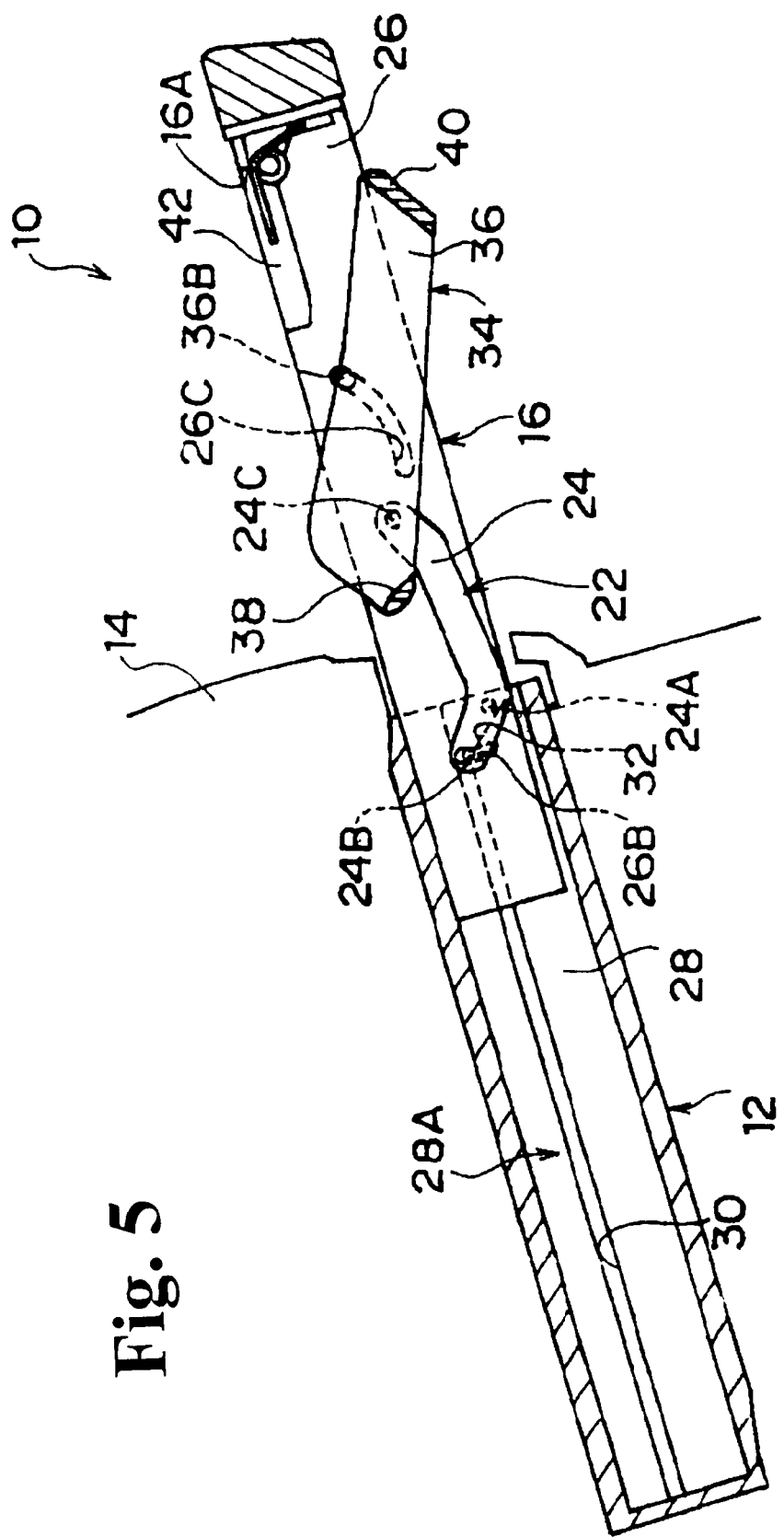
FIG. 5 is a schematic sectional view showing the container holder of the embodiment, wherein the holder is in the course of standing-up or falling-down.

Thus, as shown in FIG. 5, although the link 22 is rotated in the stand-up direction around the pin 24A, at this time, the pin 24B is moved in the circular arc hole 26B disposed to the tray 16 to absorb a difference in the distance caused by the sliding movement of the pin 24A.

Also, at this time, the holder 34 connected to the link 22 is interlocked therewith to stand up, and, at the same time, the pin 36B positioned to the holder 34 is moved along the slot 26C formed on the tray 16.

Figure 9A:
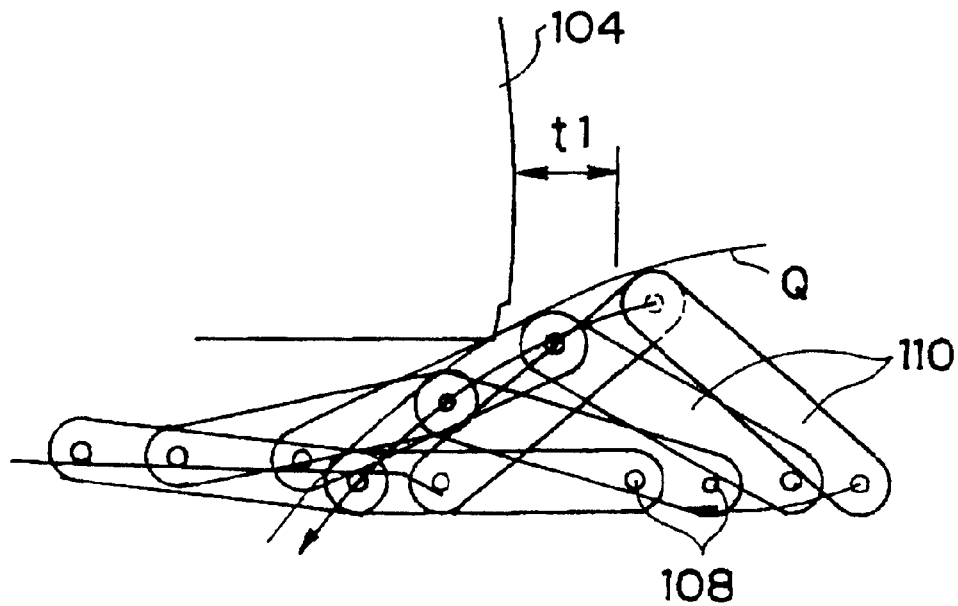
FIG. 9(A) is a view showing a concept of a moving path of a conventional holder.

As in the conventional container holder shown in FIG. 9(A), when the holder 110 is simply rotated around the pin 108 to stand up or fall down, one end portion of the holder 110 draws a moving path Q, and a clearance t1 between the dashboard 104 and the holder 110 is necessary. Incidentally, in FIGS. 9(A) and 9(B), in order to facilitate explanation of a moving path of the holder, the respective parts are shown schematically.

Figure 7:
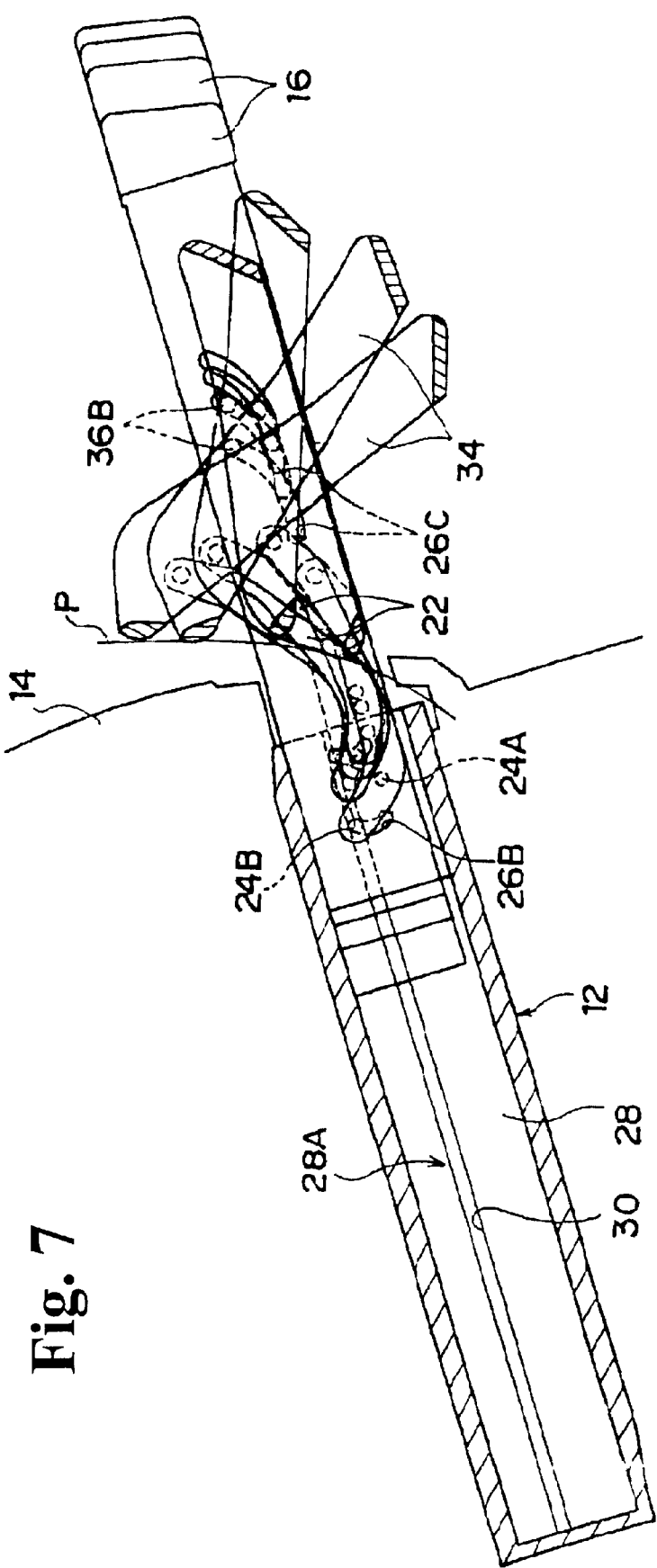
FIG. 7 is a schematic sectional view showing the container holder of the embodiment and a moving path of the holder.
Figure 9B:
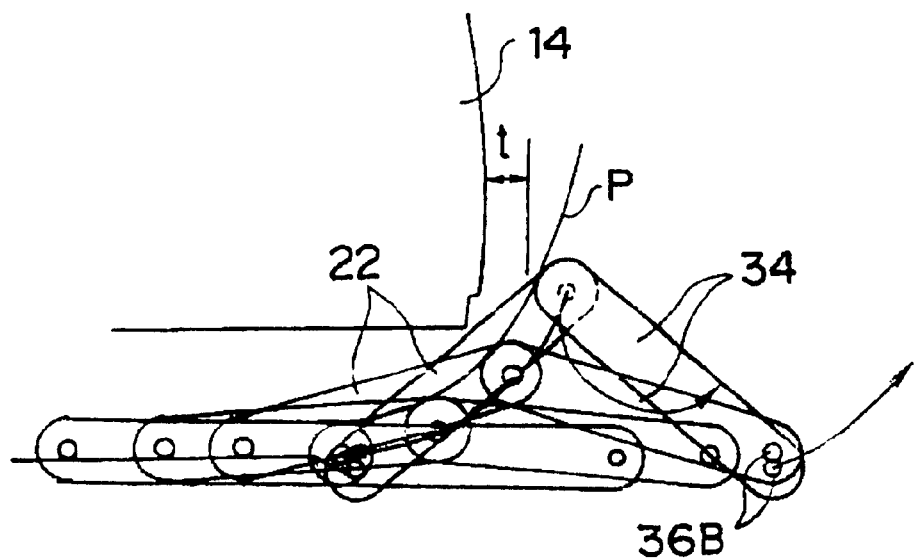
FIG. 9(B) is a view showing a concept of a moving path of the holder according to the embodiment.
Figure 10:
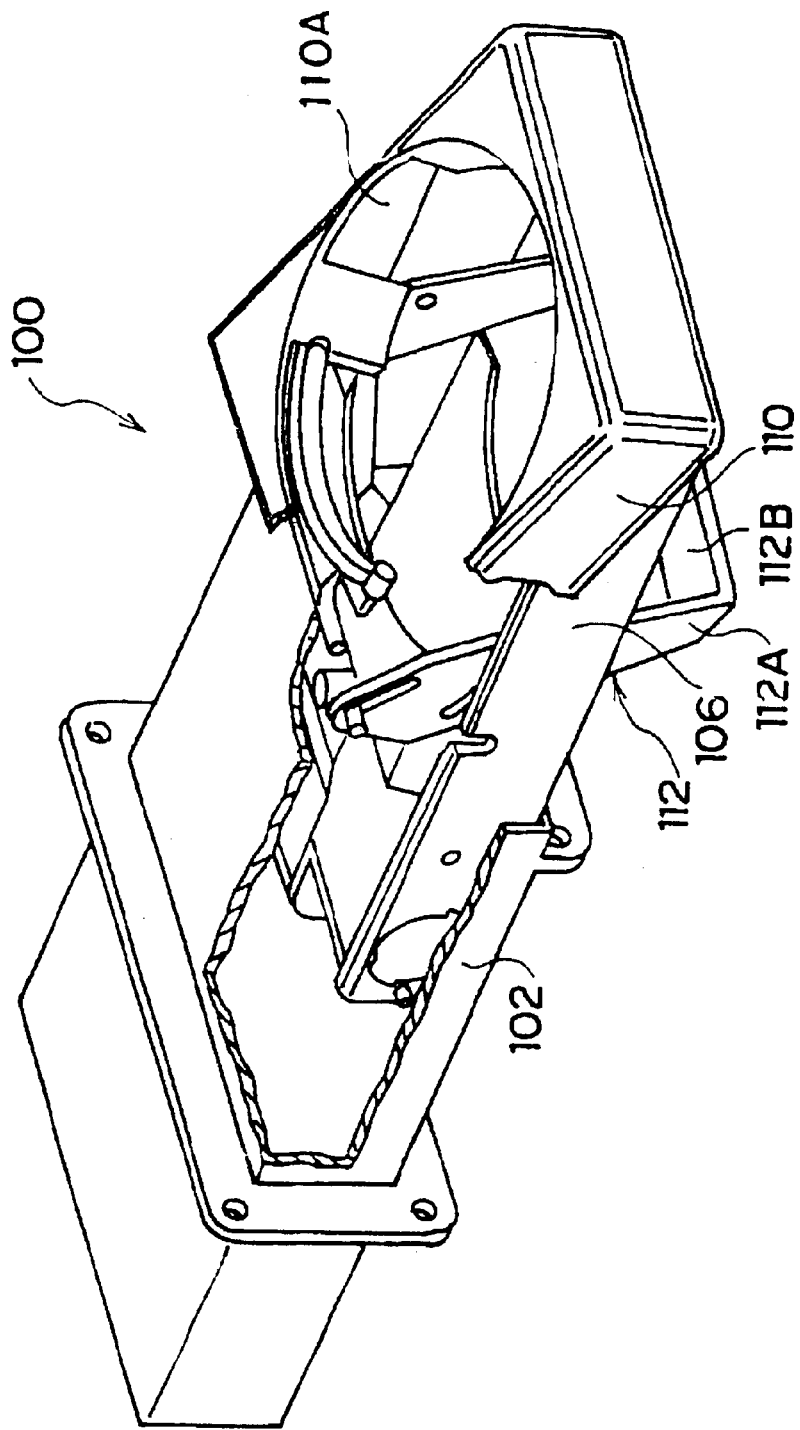
FIG. 10 is a perspective view of a conventional container holder.
Figure 11:
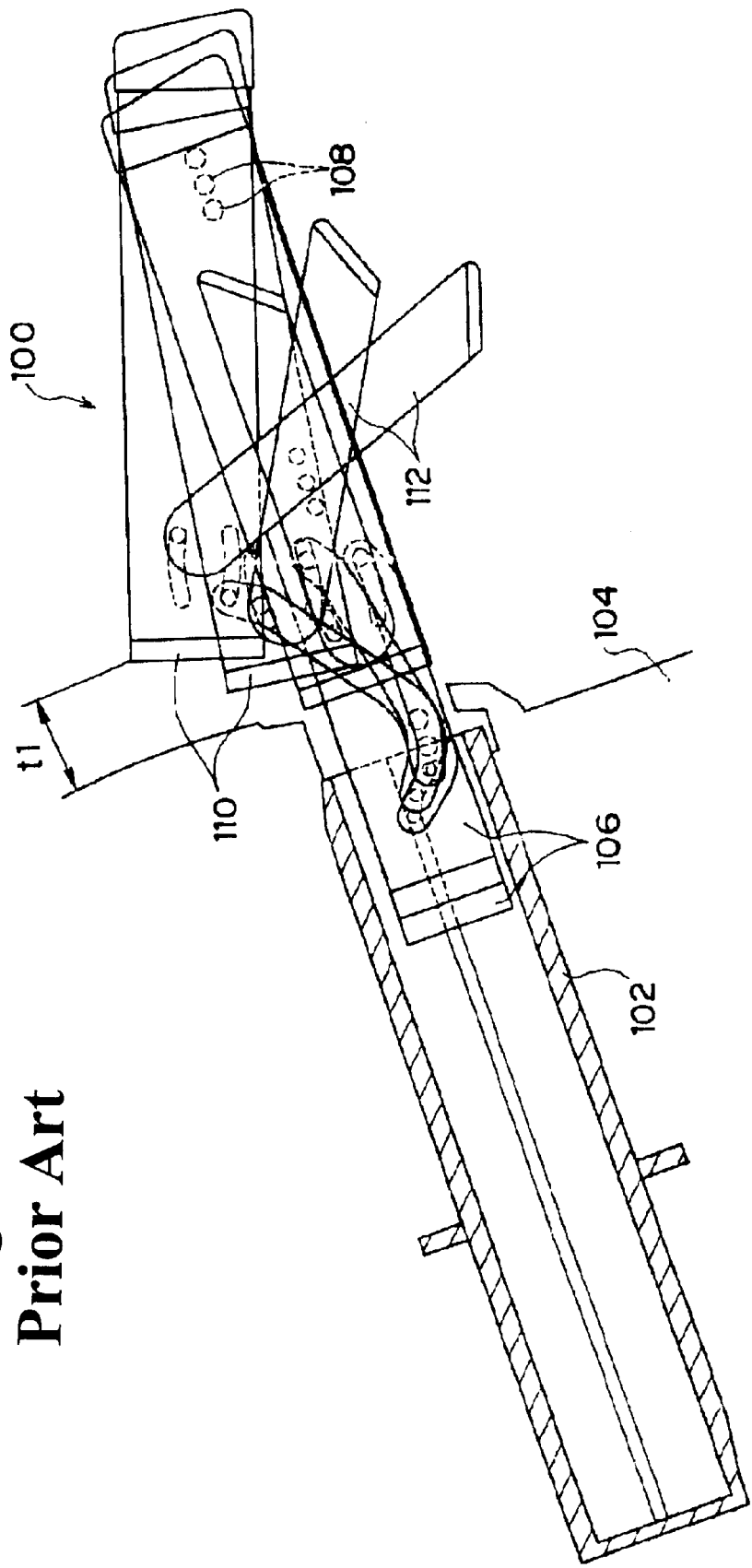
FIG. 11 is an explanatory view for showing a moving path of the conventional holder.

However, in the present invention, as shown in FIG. 7, since the holder 34 is moved while shifting its rotating center toward the end of the tray 16, i.e. while the portion of the holder facing the entrance of the case 12 moves in a direction away from the entrance, one end of the holder 34 draws a moving path P, as shown in FIGS. 7 and 9(B), so that the holder 34 stands up or falls down.

Thus, the clearance t (smaller than t1) between the dashboard 14 and the holder 34 can be reduced. Therefore, a quantity of the tray 16 projecting from the dashboard 14 can be decreased, resulting in little hindrance.

Figure 4:
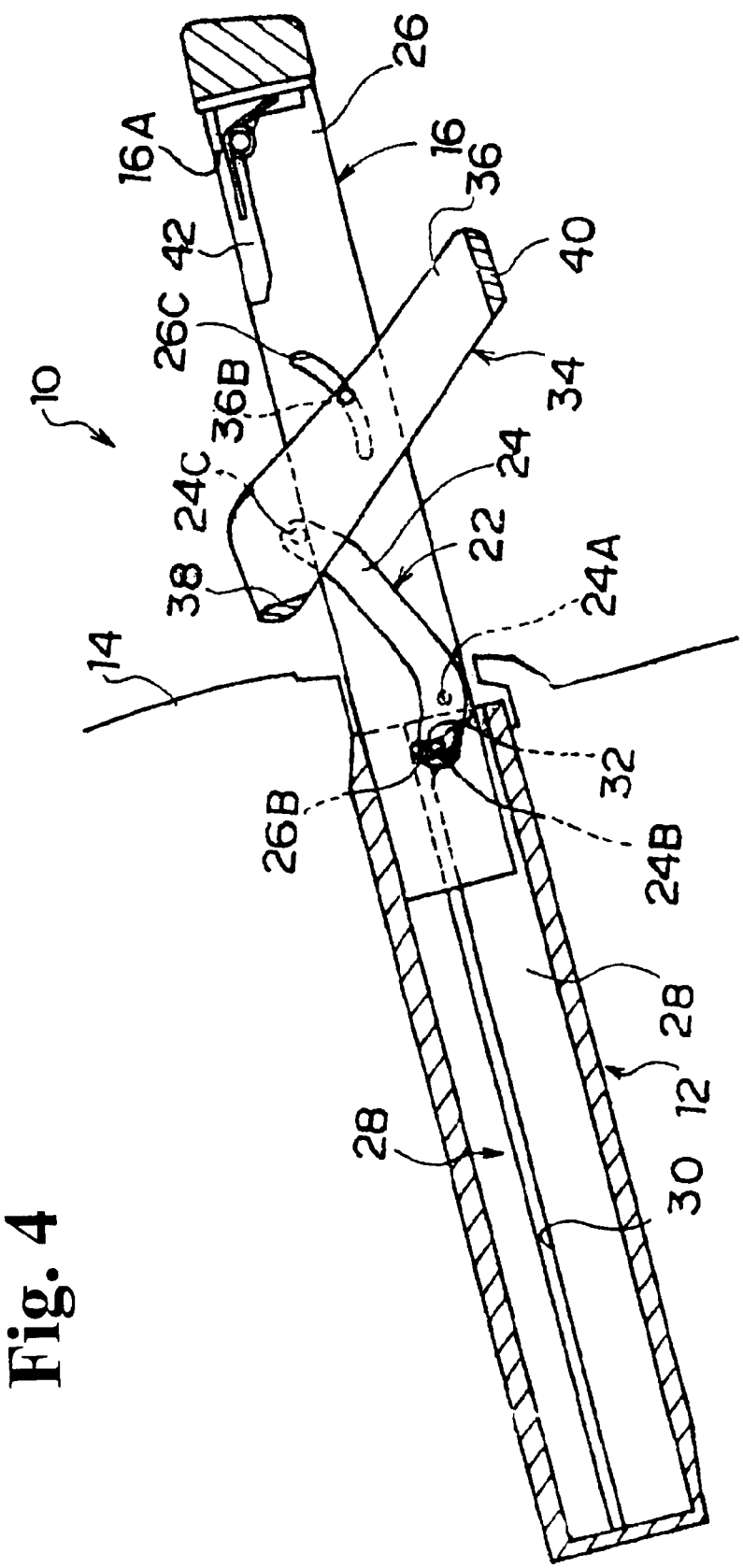
FIG. 4 is a schematic sectional view showing the container holder of the embodiment, wherein the holder is in the course of standing-up or falling-down.

When the tray 16 is housed in the case 12, as shown in FIGS. 3 and 4, the pin 24B provided to the link 22 is elevated along the inclined surface 32 of the guide groove 28A formed on the case 12 through the sliding movement of the tray 16. Then, the pin 24B is rotated in the direction in which the link 22 falls down around the pin 24A. At the same time, the pin 24B is moved in the circular arc hole 26B.

Also, at this time, the holder 34 connected to the link 22 falls down with interlocking with the link 22, and at the same time, the pin 36B provided to the holder 34 is moved along the slot 26C formed on the tray 16.

Here, as shown in FIG. 7, since the holder 34 is moved while shifting its rotating center to the front circumferential wall side of the tray 16, i.e. while a portion facing the entrance of the case 12 moves in the direction parting from the entrance, one end of the holder 34 draws the moving path P and falls down.

In this state, the pin 24B provided to the link 22 is moved along the flat surface 30 of the guide groove 28A formed on the case 12 to thereby house the tray 16 in the case 12.

As shown in FIG. 6, since the link 22 and the holder 34 do not project in a height direction of the tray 16 in the state that they fall down, the container holder 10 can be made small.

Incidentally, in the embodiment, the guide groove 28A is provided in the link 22 and the sliding movement of the tray 16 is converted to the rotation movement of the link 22. However, the present invention is not limited thereto. The same effect can be achieved when the holder stands up or falls down while shifting its rotating center toward the front circumferential wall side. Thus, the holder may be manually raised or fallen down after the tray is drawn out.

According to the first and sixth aspects of the invention, the container holder of the invention has the structure as described above. Thus, when the tray is drawn out of the case or is housed in the case, the clearance between the entrance of the case and the holder member can be made smaller, as opposed to the case where the holder member is simply rotated to stand up or fall down, by allowing the holder member to stand up or fall down while the portion facing the entrance of the case slides in a direction away from the entrance.

Thus, the clearance between the surface of, for example, a dashboard or the like for fixing the case and the holder member can be made small. Therefore, the projected quantity of the tray can be made small, which results in little hindrance.

According to the second and seventh aspects of the invention, since the guiding device is provided, the holder member can stand up or fall down through the link only by sliding the tray. Thus, the container holder is handy.

According to the third aspect of the invention, since a receiving portion for holding a container is integrally provided to the holder member, the number of the parts of the container holder can be reduced, which results in a lower cost.

According to the fourth aspect of the invention, the container is held vertically with respect to the receiving portion. According to the fifth aspect of the invention, the holder member can be held in the stand-up state through the link under the state where the tray is drawn out of the case.

While the invention has been explained with reference to the specific embodiments of the invention, the explanation is illustrative and the invention is limited only by the appended claims.

What is claimed is:

1. A container holder for holding a container, comprising:
   a case having an opening,
   a tray disposed in the case and capable of sliding in and out of the case through the opening, said tray having an opening portion for receiving the container therein and a slot at a side portion thereof,
   a holder member provided in the opening portion for supporting the container and having a first pin situated in a middle area thereof and slidably engaging the slot so that the first pin moves in the slot along stand-up and fall-down movements of the holder member, and stand-up-fall-down means attached between the tray and the holder for allowing the holder member to stand up or fall down while a portion of the holder member facing the opening of the case slides relative to the opening, said stand-up-fall-down means including a link having one end rotatably connected to the holder member, a second pin attached to the other end of the link, and a middle portion situated between the one end and the second pin and pivotally attached to the tray; and a guide device disposed in the case and engaging the second pin, said guide device converting a sliding movement of the tray to a rotational movement of the link and allowing the holder member to stand up or fall down while the holder member slides relative to the opening.

2. A container holder according to claim 1, wherein said holder member includes a holding portion for holding a side surface of the container, and a receiving portion extending from the holding portion for receiving a bottom surface of the container.

3. A container holder according to claim 2, wherein said receiving portion is arranged to be substantially horizontal in a state that the holder member stands up.

4. A container holder according to claim 1, wherein said link includes means for urging the link in a direction allowing the holder member to stand up.

5. A container holder according to claim 1, wherein said guide device is a groove formed in the case and engaging the second pin.

6. A container holder according to claim 5, wherein said groove has an inclined surface at a side of the opening, said holder member being raised by the inclined surface through the link.

7. A container holder according to claim 6, wherein said tray further includes a second slot engaging the second pin for limiting a movement of the second pin.

* * * * *